United States Patent
Wallenwein et al.

(10) Patent No.: US 6,686,418 B2
(45) Date of Patent: Feb. 3, 2004

(54) RUBBER PRODUCTS WITH LOW HEAT BUILD UP ON MECHANICAL STRESSING

(75) Inventors: Siegfried Wallenwein, Büttelborn (DE); Frank Scholl, Bad Homburg (DE); Helmut Eckes, Eppstein (DE)

(73) Assignee: Solutia Germany GmbH & Co. KG, Mainz-Kastel (DE)

( * ) Notice: Subject to any disclaimer, the term of this patent is extended or adjusted under 35 U.S.C. 154(b) by 34 days.

(21) Appl. No.: 09/862,935

(22) Filed: May 22, 2001

(65) Prior Publication Data

US 2002/0022694 A1 Feb. 21, 2002

(30) Foreign Application Priority Data

Jul. 14, 2000 (DE) .......................... 100 34 327

(51) Int. Cl.$^7$ .......................... C08J 3/24; C08K 5/3492
(52) U.S. Cl. ................ 525/135; 525/133; 525/134; 525/139; 525/141; 525/142; 525/164
(58) Field of Search ................ 525/135, 139, 525/164, 133, 134, 142, 141

(56) References Cited

U.S. PATENT DOCUMENTS 4,465,807 A * 8/1984 Giller .................... 525/135
5,906,843 A * 5/1999 Dew ....................... 426/2

FOREIGN PATENT DOCUMENTS

EP 0 013 330 7/1980

OTHER PUBLICATIONS

"Phenolic Resins for Rubber Reinforce", E. Leicht und R. Sattelmeyer; Kautschuk + Gummi Kunstsoffe, vol. 40 No. 2, pp. 126–129 (1987).

Kunststoffhandbuch Band 10 Duroplaste, Herausg. W. Woebcken, Hanser–Verlag, 2. Aufl. 1988, p. 48.

Ullmann's Encyclopedia of Industrial Chemistry, vol. A2, Ed. W. Gerhartz, 5. Aufl. 1985, pp. 115–141.

* cited by examiner

Primary Examiner—Patricia A. Short
(74) Attorney, Agent, or Firm—ProPat, L.L.C.

(57) ABSTRACT

A process for reducing the heat evolution on dynamic stressing of vulcanised rubber products, using for this purpose, in vulcanizable rubber mixtures, mixtures made from non-selfcuring novolaks A and from unetherified or partially etherified triazine resins B, as a combination of reinforcing resin and curing agent.

10 Claims, No Drawings

RUBBER PRODUCTS WITH LOW HEAT BUILD UP ON MECHANICAL STRESSING

BACKGROUND OF THE INVENTION

1. Field of the Invention

The invention relates to a process for reducing the heat build-up on dynamic stressing (energy dissipation) in vulcanised rubber products.

2. Description of the Related Art

It is known that phenol novolaks or modified phenol novolaks cured with hexamethylene tetramine (HMT) or certain melamine formaldehyde resins like the highly etherified compound hexamethoxymethyl melamine (HMMM) give good reinforcement in the vulcanisate. In particular, there is a marked increase in vulcanisate hardness and tensile strength (stress), in each case measured at a specified extension. For processing, the melamine resin derived curing agents (in particular HMMM) are used in liquid form or, as is preferred in the rubber industry, adsorbed on solid carrier materials (e.g. finely divided silica or diatomaceous earth) to become free-flowing powders with a mass fraction of from about 65 to 75% of active ingredient (in this case HMMM) (see, for example "Phenolic Resins for Rubber Reinforcement"; E. Leicht and R. Sattelmeyer; Kautschuk+ Gummi Kunststoffe, Vol. 40, No. 2/87; page 126).

According to the prior art, however, reinforcing resins in the vulcanisate do not merely increase hardness and tensile strength, but also undesirably affect the viscoelastic performance of the vulcanisates by increasing the amount of mechanical energy converted into heat and dissipated within the rubber products. This property of heat evolution and the resultant temperature increase in the event of dynamic load (heat build-up) is significant for those rubber products which in service are exposed to severe dynamic loads, for example parts in automotive tires. Now, according to the prior art, this undesirable heat evolution becomes more pronounced in a given rubber composition as the resin becomes more effective in its reinforcing action.

EP-A 0 013 330 discloses that rubber mixtures can be vulcanised in the presence of novolak resins and of reactive melamine resins obtainable by reacting melamine with from 0.5 to 6 mol of aldehyde per mole of melamine. The methylol groups present in the melamine resins may be free or may be etherified. No study was made of the effect which the melamine-resin curing agent used has on heat evolution in dynamically stressed rubber products.

There is increasing demand by the industry for systems of reinforcing resins and curing agents therefor for use in rubber products which combine good reinforcing action with moderate heat build-up in the event of dynamic load.

SUMMARY OF THE INVENTION

Surprisingly, it has now been found that the use of a combination of novolaks with selected non-etherified or at least partially etherified reaction products of formaldehyde and triazines gives good vulcanisate reinforcement together with a heat build-up markedly lower than that obtained using the same reinforcing resin and using a prior-art highly etherified melamine resin, such as HMMM (hexamethoxymethyl melamine) or using another formaldehyde source as curing agent. It was not to be expected that this combination of reinforcing resins and curing agents can be used for the purpose of reducing heat evolution in dynamically stressed rubber products.

The invention therefore provides a process for reducing the heat build-up on dynamic stressing of vulcanised rubber products, which comprises admixing for this purpose, to vulcanisable rubber mixtures, as a combination of reinforcing resin and curing agent, mixtures made from non-selfcuring novolaks A as reinforcing resins and non-etherified or partially etherified triazine resins B as curing agents for these reinforcing resins. The triazine resins suitable for the invention are those with a molar ratio of formaldehyde to triazine (F/T) of from 0.5 to 5.5 mol/mol, preferably 0.75 to 5.25 mol/mol, and especially preferred 1.0 to 5.0 mol/mol, and which are non-etherified or at least partially etherified, with a degree of etherification of preferably from 0 to 80%, based on bonded formaldehyde. The alcohols used for etherification include linear and branched aliphatic alcohols having from 1 to 18 carbon atoms.

The invention also provides combinations of novolaks A and partially etherified triazine resins B as reinforcing resins in rubber mixtures and curing agents for these, the triazine resins being condensation products of formaldehyde and of triazines selected from melamine, acetoguanamine, benzoguanamine and caprinoguanamine, or else mixtures of these, preferably only melamine, with the ratio F/T of the amount of substance of formaldehyde to the amount of substance of triazine in the resins B of from 0.5 to 5.5 mol/mol, preferably 0.75 to 5.25 mol/mol, and especially preferred 1.0 to 5.0 mol/mol, and having an amount of substance of alkoxy groups per 1 mol of triazine of (F/T-1.75 mol/mol), but at least 0.5 mol/mol, preferably at least 0.75 mol/mol, and especially preferred at least 1 mol/mol, and having an amount of substance of alkoxy groups per 1 mol of triazine of not more than F/T, preferably not more than 90% of F/T, and especially preferred not more than 80% of F/T.

The invention also provides a method of use of these combinations of novolaks A and partially etherified triazine resins B for reducing heat build-up in dynamically stressed vulcanised rubber mixtures comprising admixing these combinations to the rubber formulation.

The process for reduction of the heat build-up according to the invention can be used in a very wide variety of vulcanisable rubber mixtures to give rubber products with low heat evolution. Suitable types of rubber which may be used are sulfur-vulcanisable rubbers, e.g. natural rubber NR), styrene-butadiene rubber (SBR), polyisoprene rubber (IR), polybutadiene rubber (BR), nitrile rubber (NBR), butyl rubber (IIR), ethylene-propylene rubber (EPM), ethylene-propylene-diene rubber (EPDM) and mixtures of these, as conventionally used in the tire industry or for industrial rubber products.

Examples of usual other additives are fillers, such as carbon black, silica, chalk, and kaolin. Other constituents which may be added to the mixtures are vulcanizing agents, accelerators, activators, processing aids, antioxidants and plasticisers, e.g. mineral oils.

DETAILED DESCRIPTION OF THE PREFERRED EMBODIMENTS

Suitable reinforcing resins A are non-selfcuring phenolic resins, such as phenol novolaks, or polynuclear phenols. Examples of particularly suitable novolak resins are those made from phenol and/or from polyfunctional mono- or polynuclear phenols, such as resorcinol, or from bisphenols and/or in particular from mono- or polyhydric phenols substituted with a hydrocarbon radical, for example alkyl- or aralkylphenols whose substituent has from 1 to 20 carbon atoms, preferably from 4 to 18 carbon atoms, for example tert.-butylphenol, octylphenol, the phenols cardol and cardanol present as a mixture in the oil from cashew nut shells, and also those from styrenated phenols, or fatty-acid-modified, e.g. linseed-oil-fatty acid-modified, phenol or phenylphenol. Useful phenolic resins may also comprise mixtures of the individual resins and resins made from mixtures of these phenols.

These reinforcing resins are prepared by reacting the phenol or the mixture of phenols with aldehydes, such as acetaldehyde, but preferably formaldehyde, in an acid medium as in the prior art. The novolaks may also have some content of plasticizing materials, such as polyethylene glycols, tall oil, or other conventional plasticisers. The phenolic resins may also have been modified with natural resins, such as colophony or tall resin, or with terpenes, and in specific cases the natural resin content may even predominate.

Preferred are those novolaks A where the phenols comprise a mass fraction of at least 10% of alkylphenols having at least one alkyl group per phenol ring and having an alkyl radical of from 1 to 20 carbon atoms. Especially preferred are reaction products of mixtures of phenol and tert-butylphenol with formaldehyde as novolaks A.

The triazine resins B used according to the invention are non-etherified or at least partially etherified reaction products of aminotriazines with aldehydes, preferably with formaldehyde. Besides melamine, also guanamines, e.g. acetoguanamine, benzoguanamine and caprinoguanamine may be used as aminotriazines, or triazines. The preferred triazine is melamine or a mixture of melamine with one of the other triazines mentioned, the mass fraction of these triazines in the triazine mixture being not more than 15%, preferably not more than 10%.

The molar ratio of alkoxy groups to triazine molecules (A/T) is related to the degree of etherification which, in the case of formaldehyde resins, is the ratio between the amount of substance of etherified methylol groups (=alkoxymethyl groups) and the total of the amount of substance of of etherified (alkyoxymethyl) and unetherified (hydroxymethyl) methylol groups in the relevant triazine resin and can be expressed as the product of F/T and the degree of etherification. The etherification agents used may comprise linear or branched aliphatic alcohols having from 1 to 18 carbon atoms, in particular from 1 to 4 carbon atoms, in particular methanol, ethanol, n-propanol, isopropanol, n-butanol, isobutanol, sec.-butanol or tert.-butanol. It is preferable for the resins B to have been etherified with methanol or isobutanol, particularly preferably with methanol. It is further preferable that the triazine used to prepare the resin B together with formaldehyde is melamine or a mixture of melamine with other triazines, the mass fraction of melamine in the triazine mixture being at least 50%, preferably at least 65%, in particular at least 85%.

Particularly suitable are those resins B where only melamine is used as triazine, having an amount of substance of from 0.5 to 5.5 mol, preferably from 1.0 to 5.0 mol, in particular from 1.5 to 4.5 mol, of bonded formaldehyde (in the form of N-methylol groups) per 1 mol of melamine, and having an amount of substance of alkoxy groups per 1 mol of triazine of (F/T-1.75 mol/mol), but at least 0.5 mol/mol, preferably at least 0.75 mol/mol, and especially preferred at least 1 mol/mol, and having an amount of substance of alkoxy groups per 1 mol of triazine of not more than F/T, preferably not more than 90% of F/T, and especially preferred not more than 80% of F/T.

The aqueous resin solutions comprising the partially etherified triazine resin can be converted to powder form by spray drying [Kunststoffhandbuch [Plastics Handbook] Vol. 10, Thermosets, ed. W. Woebcken, Hanser-Verlag, $2^{nd}$ edn. 1988, p. 48; Ullmann's Encyclopedia of Industrial Chemistry, Vol. A2, ed. W. Gerhartz, $5^{th}$ edn. 1985, p. 116–141]. The resin solutions may also be absorbed onto finely divided silica powders as carriers, and then dried.

Preferably, the ratio of the mass of the novolak A to the mass of the triazine resin B is from 1:2 to 5:1.

The vulcanisable rubber mixtures of the invention are prepared by known methods. For example, they are prepared in internal mixers or on mixing rolls. To improve distribution of the reinforcing resins A, it is useful to increase the temperature of the mixture during the mixing procedure to above the melting range of the reinforcing resin A. However, to avoid premature reaction with the crosslinkable reinforcing resin A, care has to be taken that the curing agent B is not added before the second mixing stage, together with the sulfur and optionally, with the accelerators, and at temperatures which are not too high (preferably from 70 to 120° C.).

The remaining constituents, i.e. the rubber or rubber mixture itself and all of the additives with the exception of triazine resin B, and with the exception of the accelerators, if any, and sulfur, are mixed in the first mixing stage in the usual manner, preferably at temperatures of from 100 to 170° C., in internal mixers or on conventional heatable mixing rolls.

Examples of the use of the vulcanisates of the invention are use as industrial rubber products, such as dampers, rubber sleeves, bellows, conveyor belts, hose and V-belts, and in particular use in tires for vehicles.

The mixtures of the invention may also be used in layers which have to have good adhesion to reinforcing inserts, for example to fabrics or to braids. To improve adhesion, use may also be made of adhesion promoters as further additives.

In the vulcanisable rubber mixtures, the mass fraction of the mixtures made from reinforcing resin A and from triazine resins B may preferably be from 1 to 20%, in particular from 2 to 15%, particularly preferably from 2.5 to 10%, based on the total mass of the vulcanisable rubber mixture.

The examples below further illustrate the invention. For the purposes of the present invention, "silica" in the examples is finely divided silicon dioxide.

EXAMPLES

Reinforcing Resins

Phenolic Resin A:

Commercially available non-selfcuring alkylphenol-modified reinforcing resin (®Alnovol PN 160 from Solutia Germany GmbH & Co. KG) with a melting range of from 71 to 81° C. and with a viscosity (measured at 23° C. on a 50% strength solution in methoxypropanol according to DIN 53177) of from 700 to 1100 mPa·s Phenolic Resin B:

Commercially available non-selfcuring alkylphenol-modified reinforcing resin (®Alnovol PN 166 from Solutia Germany GmbH & Co. KG) with a melting range of from 65 to 75° C. and with a viscosity (measured at 23° C. on a 50% strength solution in methoxypropanol according to DIN 53177) of from 350 to 750 mPa·s

Melamine Resin Curing Agents

Melamine Resin A:
non-etherified pure melamine-formaldehyde resin with a molar ratio of 1.6 mol of bonded formaldehyde per 1 mol of melamine, adsorbed onto precipitated silica (®Perkasil SM 408, Weber & Schaer, Hamburg) with a content of 60% of active ingredient

Melamine Resin B:
non-etherified pure melamine-formaldehyde resin with a molar ratio of 4 mol of bonded formaldehyde per 1 mol of melamine, adsorbed onto precipitated silica (®Perkasil SM 408, Weber & Schaer, Hamburg) with a content of 60% of active ingredient

Melamine Resin C:
partially methanol-etherified melamine-formaldehyde resin with a molar ratio of 2.2 mol of bonded formaldehyde and 1.3 mol of bonded methanol per 1 mol of melamine, adsorbed onto precipitated silica (®Perkasil SM 408, Weber & Schaer, Hamburg) with a content of 65% of active ingredient

Melamine Resin D:
partially methanol-etherified melamine-formaldehyde resin with a molar ratio of 3.8 mol of bonded formaldehyde and 2.2 mol of bonded methanol per 1 mol of melamine, adsorbed onto precipitated silica (®Perkasil SM 408, Weber & Schaer, Hamburg) with a content of 65% of active ingredient

Melamine Resin E:
partially methanol-etherified melamine-formaldehyde resin with a molar ratio of 3.2 mol of bonded formaldehyde and 1.6 mol of bonded methanol per 1 mol of melamine, adsorbed onto precipitated silica (®Perkasil SM 408, Weber & Schaer, Hamburg) with a content of 65% of active ingredient

Melamine Resin F:
spray-dried non-etherified pure melamine-formaldehyde resin with a molar ratio of 1.6 mol of bonded formaldehyde per 1 mol of melamine

HMMM:
Commercially available hexamethoxymethyl melamine (HMMM) adsorbed onto precipitated silica (®Additol XT 922 from Solutia Germany GmbH & Co. KG)

Vulcanisate Testing

Vulcanised rubber cylinders of length 100 mm and diameter 20 mm were used as test specimens in a rolling flexure test with a deflection of 25°. The purpose of the dynamic testing was to measure the heat build-up in the deflected rotating test specimen, in each case after 10 000 and 20 000 rotations.

The test apparatus is composed of an electric motor with chuck and an opposite mounting which can be deflected. The temperature increase is measured by a temperature sensor inserted for this purpose into the rubber specimen (halfway between chuck and opposite mounting).

Table 1 shows the composition of the rubber mixtures tested after full vulcanisation. To this end, reinforcing resin and curing agent were in each case admixed with this primary composition.

TABLE 1

| primary rubber composition used in tests | |
|---|---|
| Constituent | Mass in g |
| Natural rubber | 100 |
| ® Renacit 11 (peptising agent) | 0.2 |
| N 326 carbon black | 70 |
| RS zinc oxide | 5 |
| Stearic acid | 1.5 |
| Antioxidant | 2 |
| Sulfur | 2.5 |
| ® Vulkacit CZ (accelerator) | 1.2 |

In the tables below, the varying heat build-up in vulcanised rubber parts can be seen as a function of the reinforcing resin used and, respectively, of the formaldehyde source used. In each case here, differing types and amounts of the relevant phenolic resins and melamine resins were added to the primary composition (in each case 182.4 g of the composition) specified in Table 1.

Table 2 shows the effect the added reinforcing resin and curing agent had on the mechanical properties of, and the heat build-up in, the vulcanisates. Phenolic resins A or B were used as reinforcing resin, and the non-etherified melamine resin curing agents B or F were used as curing agents for the phenolic resins, in comparison with mixtures according to the prior art using HMMM (=hexamethoxymethyl melamine).

TABLE 2

| Mixture | | | 1 | 2 | 3 | 4 | 5 | 6 |
|---|---|---|---|---|---|---|---|---|
| Reinforcing resin | | | | (comp.) | | (comp.) | | |
| Phenolic resin A | | g | 7 | 7 | — | — | 7 | — |
| Phenolic resin B | | g | — | — | 7 | 7 | — | 7 |
| Curing agent | | | | | | | | |
| Melamine resin B | | g | 5 | — | 5 | — | — | — |
| HMMM | | g | — | 4.6 | — | 4.6 | — | — |
| Melamine resin F | | g | | | | | 3 | 3 |
| Vulcanisation | at 145° C. | min | 30 | 45 | 30 | 45 | 30 | 30 |
| Mechanical properties: | | | | | | | | |
| Stress value | at 10% | MPa | 4.5 | 5.3 | 4.5 | 4.8 | 4.6 | 4.5 |
| Stress value | at 100% | MPa | 9.8 | 10.2 | 9.9 | 9.6 | 9.7 | 9.8 |

TABLE 2-continued

| Mixture | | | 1 | 2 | 3 | 4 | 5 | 6 |
|---|---|---|---|---|---|---|---|---|
| Shore A hardness | at 23° C. | | 94 | 96 | 94 | 96 | 93 | 94 |
| Shore A hardness | at 70° C. | | 91 | 93 | 88 | 93 | 91 | 90 |
| Heat build-up | after 10 000 r | ° C. | 109 | 149 | 106 | 137 | 108 | 104 |
| Heat build-up | after 20 000 r | ° C. | 110 | 160(*) | 107 | 150 | 110 | 107 |
| $t_5$ | | min | 2.3 | 4.8 | 2.8 | 4.2 | 2.1 | 2.5 |
| $t_{90}$ | | min | 19.1 | 37.1 | 19.5 | 37.5 | 18.9 | 19.3 |

(*)specimen fractured
r = rotations
$t_5/t_{90}$: vulcanisation time (5%/90% of final torque as measured in a vulcameter)

As can be seen from Table 2, the vulcanisates made from the mixtures 1, 3, 5 and 6 of the invention each already exhibit markedly lower heat build-up when compared with mixtures 2 and 4 of the prior art. Whereas in the case of the standard mixtures 2 and 4 a further temperature rise of 11 and, respectively, 13° C. takes place between 10 000 and 20 000 rotations (mixture 2: from 149 to 160° C.; mixture 4: from 137 to 150° C.), in the case of the mixtures 1 and 3 of the invention this further increase is only 1° C. (mixture 1: from 109° C. to 110° C.; mixture 3: from 106° C. to 107° C.).

As can also be seen from Table 2, $t_5$ and $t_{90}$ (measured according to DIN 53 529 in a conventional Monsanto vulcameter) of the mixtures 1, 3, 5 and 6 of the invention are markedly lower than those for the standard mixtures 2 and 4. Vulcanisation times of 30 minutes were sufficient in these cases, while 45 minutes were needed for examples 2 and 4.

The resultant shorter vulcanisation times permit a saving in energy costs and lead to shorter cycle times, and this in turn implies higher productivity.

Table 3 shows the mechanical properties of, and the heat build-up in, vulcanised rubber parts reinforced with phenolic resin A in combination with the non-etherified or partially etherified melamine-resin curing agents (melamine resin A through melamine resin E; resins A and B being non-etherified, and C through E being partially etherified) as curing agents in comparison with the prior art using HMMM (=hexamethoxymethyl melamine) as curing agent.

TABLE 3

| Mixture | | | 7 | 8 | 9 | 10 | 11 | 12 (comp.) |
|---|---|---|---|---|---|---|---|---|
| Reinforcing resin: | | | | | | | | |
| Phenolic resin A | | g | 7.00 | 7.00 | 7.00 | 7.00 | 7.00 | 7.00 |
| Curing agent: | | | | | | | | |
| Melamine resin A | | g | 5.00 | | | | | |
| Melamine resin B | | g | | 5.00 | | | | |
| Melamine resin C | | g | | | 4.62 | | | |
| Melamine resin D | | g | | | | 4.62 | | |
| Melamine resin E | | g | | | | | 4.62 | |
| HMMM | | g | | | | | | 4.62 |
| Vulcanisation | at 145° C. | min | 20 | 30 | 15 | 15 | 15 | 45 |
| $t_5$ | | min | 3.4 | 2.3 | 3.4 | 3.4 | 3.9 | 4.8 |
| $t_{90}$ | | min | 15.7 | 19.1 | 10.9 | 12.4 | 11.7 | 37.1 |
| Mechanical properties | | | | | | | | |
| Stress value | at 10% | MPa | 3.5 | 4.5 | 3.1 | 3.2 | 3.1 | 5.3 |
| Stress value | at 100% | MPa | 8.9 | 9.8 | 8.2 | 8.4 | 8.5 | 10.2 |
| Shore A hardness | at 23° C. | | 93 | 94 | 92 | 93 | 92 | 96 |
| Shore A hardness | at 70° C. | | 87 | 91 | 80 | 83 | 82 | 93 |
| Heat buildup | after 10 000 r | (° C.) | 94 | 109 | 83 | 92 | 86 | 149 |
| Heat build-up | after 20 000 r | (° C.) | 98 | 110 | 85 | 97 | 88 | 160 |

Example 8 shows moderate heat build-up together with low loss of hardness on heating (fall-off in Shore A hardness by only 3, from 94 to 91, whereas the loss in hardness with the other formulation is markedly higher). The comparison (12) has a similarly low loss in hardness on heating from 23 to 70° C., but has markedly higher heat build-up.

The lowest heat build-up can be seen in Examples 9, 10, and 11. These are the cases where melamine resins C, D, and E are used where the ratios F/T and A/T are 2.2 and 1.3 mol/mol for C; 3.8 and 2.2 mol/mol for D; and 3.2 and 1.6 for E which conform to the preferred condition that there is an amount of substance of from 0.5 to 5.5 mol of bonded formaldehyde (in the form of N-methylol groups) per 1 mol of melamine, and that there is an amount of substance of alkoxy groups per 1 mol of triazine of (F/T-1.75 mol/mol), but at least 0.5 mol/mol and not more than F/T.

What is claimed is:

1. A process for reducing the heat build-up on dynamic stressing of vulcanised rubber products, which comprises admixing for this purpose, to vulcanisable rubber mixtures, mixtures made from non-selfcuring novolaks A as reinforcing resins and at least partially etherified triazine resins B as curing agents for these reinforcing resins, wherein the triazine resins B have a molar ratio of formaldehyde to triazine (F/T of from 0.5 to 5.5 mol/mol, having a ratio A/T of the amount of substance of alkoxy groups to the amount of substance of triazine in the triazine resin B of from the higher of (F/T−1.75 mol/mol) and 0.5 mol/mol, up to not more than 90% of F/T, and wherein the alcohols used for etherification are selected from the group consisting of linear and branched aliphatic alcohols having from 1 to 18 carbon atoms.

2. The process as claimed in claim 1, wherein the triazines used for preparing the triazine resin B have a mass fraction of at least 50% of melamine.

3. The process as claimed in claim 1, wherein the triazine resins B are etherified with methanol.

4. The process as claimed in claim 1, wherein reaction products of phenols with formaldehyde are used as novolaks A, where the phenols comprise a mass fraction of at least 10% of alkylphenols having at least one alkyl group per phenol ring and having an alkyl radical of from 1 to 20 carbon atoms.

5. The process as claimed in claim 1 , wherein reaction products of mixtures of phenol and tert-butylphenol with formaldehyde are used as novolaks A.

6. The process as claimed in claim 1, wherein the ratio of the mass of the novolak A to the mass of the triazine resin B is from 1:2 to 5:1.

7. The process as claimed in claim 1, wherein the mass fraction of the mixture made from novolak A and triazine resin B in the mass of the vulcanisable rubber composition is from 1 to 20 percent.

8. The process as claimed in claim 1 wherein the triazine resin is adsorbed on finely divided silica.

9. The process of claim 1 which comprises the steps of mixing in a first stage, all the components of the rubber mixture wit the exception of the triezine resin B, accelerators, and sulfur, at temperatures of from 100 to 170° C., adding in the second stage, the triazine resin B together with sulfur and accelerators, if any, at temperatures from 70 to 120° C., and mixing in that temperature range.

10. The process of claim 9 where the temperature in the first mixing step is increased to above the melting range of the reinforcing resins A.

* * * * *